Nov. 1, 1949.       K. B. AUSTIN       2,486,546
HOTBOX SIGNAL FOR RAILWAY TRAINS
Filed Nov. 24, 1945
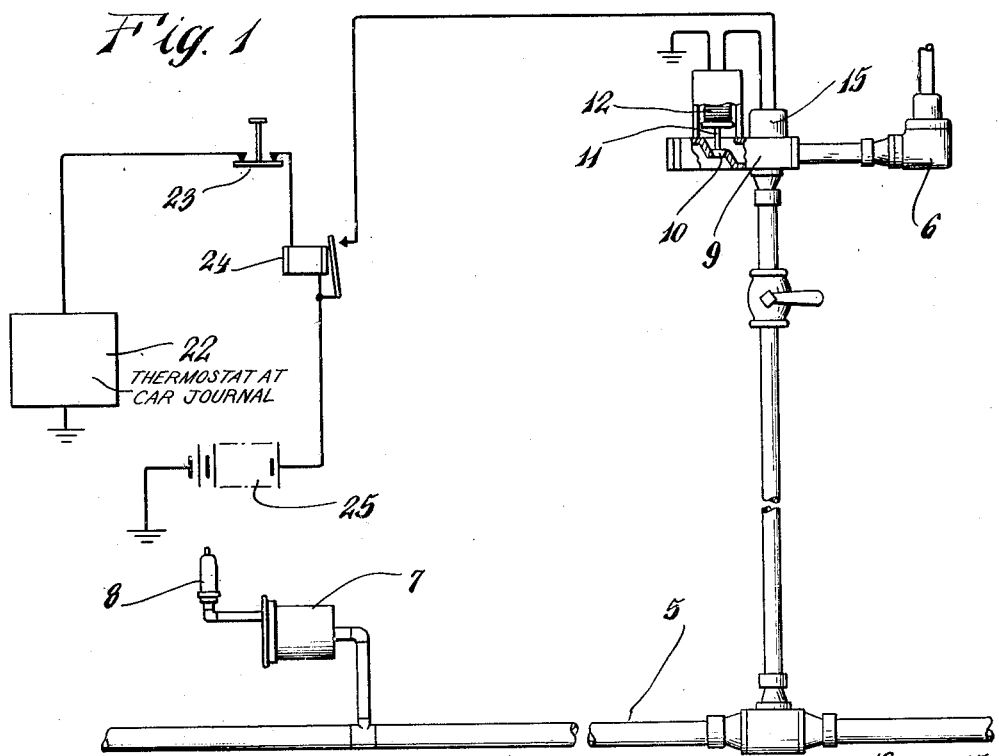
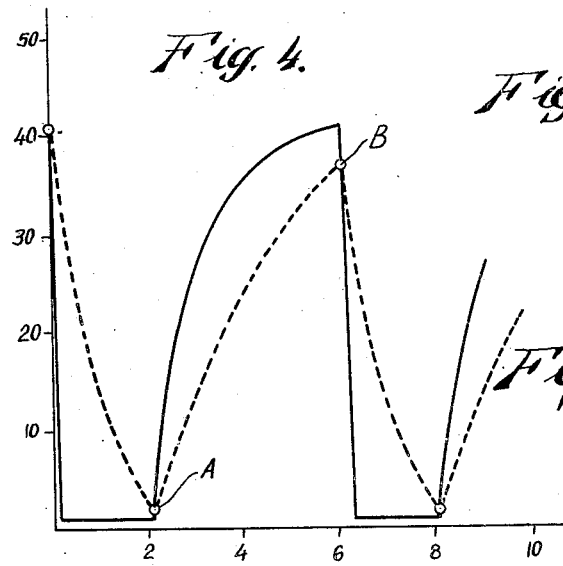
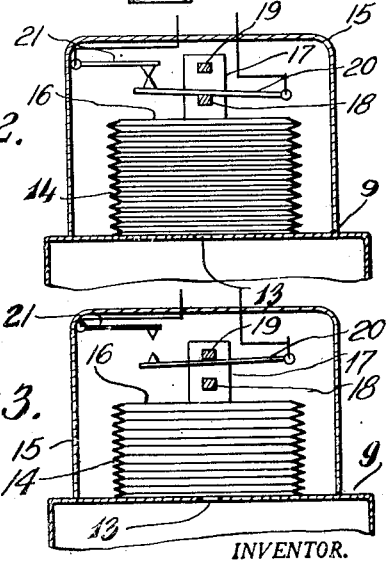
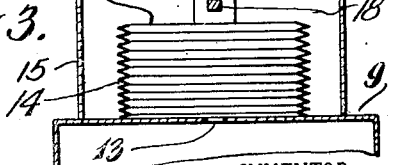
INVENTOR.
Kirby B. Austin
BY Kenyon & Kenyon
ATTORNEYS.

Patented Nov. 1, 1949

2,486,546

UNITED STATES PATENT OFFICE 2,486,546

HOTBOX SIGNAL FOR RAILWAY TRAINS

Kirby B. Austin, Bridgeport, Conn., assignor, by mesne assignments, to Allied Control Company, Inc., a corporation of New York Application November 24, 1945, Serial No. 630,575

8 Claims. (Cl. 246—169)

This invention relates to hot-box signals for railway trains.

Railway passenger trains are equipped with air-signal systems, by means of which a trainman may signal the engineer. Such a system includes a whistle or the like in the engineer's cab and valve-controlled vents in the cars for operation by a trainman. The opening of a vent causes operation of the whistle in the engineer's cab and by proper manipulation of a valve the trainman may signal the engineer.

An object of this invention is to provide the air-signal system with equipment by means of which a distinctive signal will be conveyed to the engineer in the event that any car develops a hot-box.

Other objects, novel features and advantages of this invention will become apparent from the following specification and accompanying drawings, wherein:

Fig. 1 is a schematic view of an air-signal system provided with equipment embodying the invention;

Figs. 2 and 3 are enlarged sections of a part of the equipment, and

Fig. 4 is a graph representing the operation of the device.

A conventional railway train air-signal system is designated by 5 and the usual car valve of such a system is designated by 6 while 7 designates the engineer's signal valve and 8 the whistle in the engineer's cab. For each car, the system is provided with an additional vent in the form of a duct 9 controlled by a self-closing valve 10 having a stem 11 constituting the armature of a solenoid 12 so that the valve is lifted from its seat upon energization of the solenoid.

As shown in Figs. 2 and 3, the duct 9 is provided with an orifice 13 which communicates with the interior of a bellows member 14 enclosed in a housing 15 mounted on the duct 9. Through the orifice 13, the interior of the bellows member 15 is subjected to the pressure existing in the duct 9 and expands and contracts in response to pressure variation within itself.

The movable end 16 of the bellows member 14 carries a bracket 17 equipped with two spaced studs 18 and 19. A lever 20 pivoted at one end projects between the studs 18 and 19 and constitutes the movable contact of an electrical switch, the lever being composed of conductive metal and being suitably insulated from the bellows member 14. The mounting of the contact 20 is such that it automatically remains in any position to which it is moved until force is again applied to it. A stationary contact 21 is arranged for engagement by the end of the contact 20. The elements 17 to 21 are enclosed within the housing 15 and suitable conductors lead from the contact members 20 and 21 to the exterior of the housing 15. The arrangement is such that when low pressure exists in the bellows member 14 and it is in contracted condition, the stud 19 holds the contact 20 out of engagement with the contact 21 but when high pressure exists within the bellows member 14, it is expanded sufficiently that the stud 18 holds the contact 20 in engagement with the contact 21.

In Fig. 1, 22 indicates a car journal equipped with a conventional thermostat. The thermostat is in a circuit including a self-closing switch 23, the coil of a relay 24 and a battery 25. The arrangement is such that the thermostat closes said circuit when the journal temperature is normal, but opens the circuit when the journal becomes overheated. The battery 25 is connected through the contacts of the relay 24 to the movable switch member 20 while the stationary switch member 21 is connected through the coil of the solenoid 12 to ground. The energizing circuit for the solenoid 12 is open as long as the relay 24 is energized.

The operation of the equipment above described is as follows:

With normal temperature existing in the journal 22, the thermostat therein maintains closed the circuit including the winding of the relay 24 so that the relay is energized to maintain its contacts out of engagement. The solenoid 12 is consequently de-energized so that the valve 10 in the duct 12 is seated. The bellows 14 is subjected to the pressure in the system 5 and, therefore, is in its expanded position as shown in Fig. 2 with the contact 20 engaging the contact 21. Upon development of a hot-box in the journal 22, the thermostat therein operates to open the circuit through the winding of relay 24 with consequent de-energization thereof to permit the relay contacts to close the solenoid circuit through the contacts 20 and 21, thereby lifting the valve 10 to open the vent. The pressure reduction in the system 5 causes operation of the whistle 8 in the engineer's cab. The pressure reduction in the system 10 also results in slow reduction of the pressure in the bellows 14 by reason of leakage through the orifice 13. Upon engagement of the stud 19 with the movable contact 20, the latter is disengaged from the contact 21 as shown in Fig. 3 to open the solenoid circuit whereupon the valve 10 returns to closed position and the pressure in the system 5 builds up to normal to cut off the whistle 8. The pressure in the bellows 14 gradually rises by influx of air through the orifice 13 until the stud 18 again engages the movable contact 20 and lifts it into engagement with the contact 21 again to close the solenoid circuit whereupon the cycle just described is repeated. The lost-motion connection between the movable contact 20 and the bellows member 14 permits a predetermined extent of movement of the bellows member before actuation of the contact. The engineer's whistle 8 is thus caused to emit a series of equal length blasts at predetermined intervals, thereby giving him positive indication of the existence of a hot-box. The device will continue to operate until the hot-box condition is remedied.

Fig. 4 is a time-pressure graph illustrating the operation of the above-described system. In the graph, the abscissae measure time and seconds while the ordinates measure pressure in pounds per square inch. The full line curve represents the pressure in the signal pipe while the dash line represents the pressure in the bellows. Assume that the solenoid circuit is closed at zero time with 40 pounds pressure in the signal pipe. Energization of the solenoid lifts the valve 10 to open the vent 9. Thereupon, the signal pressure in the signal pipe adjacent the vent 9 drops almost immediately to the value at which the whistle 8 is caused to operate, but this pressure drop does not reach the valve 7 for a matter of a couple of seconds. The design of the valve 7 and its control mechanism is such that when the required pressure drop is effected at the valve, the whistle 8 emits a blast of predetermined length irrespective of the length of time that the pressure in the signal line is kept at its low value. Meanwhile air escapes from the bellows 14 through the orifice 13, the area of which is such that it requires approximately two seconds for the stud 19 to engage the contact member 20 to separate it from the contact member 21, thereby opening the solenoid circuit with concomitant closing of the valve 10. A designates the point at which the solenoid circuit is opened. In a matter of three or four seconds, the pressure in the signal pipe line increases so that the pressure at the vent again equals 40 pounds. Meanwhile, the pressure in the bellows builds up at a slower rate than in the signal pipe and the arrangement is such that by the time the pressure in the bellows has reached approximately 35 pounds, the contact member 20 is again engaged with the contact member 21 to close the solenoid circuit and cause the valve 10 again to lift. The point at which the solenoid circuit is again closed is indicated at B. The whistle 8 is thus caused to blow uniformly spaced equal-length blasts indicating a hot box.

It is of course understood that various modifications may be made in the device above described, without in any way departing from the spirit of the invention as defined in the appended claims.

I claim:

1. In combination with a normally closed train fluid pressure system normally filled with fluid under pressure, a hot box indication arrangement comprising, means for opening and closing said system to permit respectively the escape of fluid therefrom and the restoration of fluid pressure therein, second means adapted to actuate in response to the occurrence of a hot box said first means to open said pressure system to the escape of fluid with consequent reduction of pressure therein, third means responsive to said reduction in pressure for causing said first means again to close said system upon reduction of pressure to a predetermined degree and for causing said first means again to open said system responsive to restoration of pressure to a predetermined degree, said second and and third means being so constructed and arranged as to cause said first means to open and close said system with a characteristic periodicity so long as said hot box response persists, and a signal responsive to the periodic alternations in pressure in said system caused by the operation of all of said means.

2. A combination as in claim 1 in which said third means is so constructed and arranged that a time lag occurs between the changes in pressure in said system and the operation of said first means by said third means.

3. In combination with a normally closed train fluid pressure system normally filled with fluid under pressure, a hot box indication arrangement comprising, a valve for opening and closing said system to permit respectively the escape of fluid therefrom and the restoration of fluid pressure therein, a solenoid for operating said valve to open and closed positions, a circuit for controlling said solenoid including first means adapted to actuate, in response to the occurrence of a hot box, said solenoid to cause said valve to open said pressure system to the escape of fluid with consequent reduction of pressure therein, second means in said circuit responsive to said reduction in pressure for causing said solenoid and valve again to close said system upon reduction of pressure therein to a predetermined degree and responsive to consequent restoration of pressure therein for causing said solenoid and valve again to open said system upon restoration of pressure to a predetermined degree, said second means being so constructed and arranged as to cause said solenoid and valve to open and close said system with a characteristic periodicity so long as said hot box response persists, and a pressure operated periodic signal responsive to the periodic alternations in pressure in said system caused by the operation of said valve.

4. A combination as in claim 3 in which said second means is so constructed and arranged that a time lag occurs between the changes in pressure in said system and the operation of said solenoid and valve by said second means.

5. In combination with a normally closed train air pressure system normally filled with air under pressure, a hot box indication arrangement comprising, a valve for opening and closing said system to permit respectively the escape of air therefrom and the restoration of air pressure therein, a solenoid for operating said valve to open and closed positions, a circuit for controlling said solenoid including a first switch adapted to actuate in response to the occurrence of a hot box said solenoid to cause said valve to open said air pressure system to the escape of air with consequent reduction of pressure therein, a second switch in said circuit, a pressure expandible and contractible device responsive to said reduction in pressure for causing said second switch to cause said solenoid and valve again to close said system upon reduction of pressure therein to a predetermined degree and responsive to consequent restoration of pressure therein for causing said second switch to cause said solenoid and valve again to open said system upon restoration of pressure to a predetermined degree, said device being so constructed and arranged as to cause said valve to open and close said system with a characteristic periodicity so long as said hot box response persists, and a pressure operated periodic signal device connected to said system and responsive to the periodic alternations in pressure therein caused by the operation of said valve.

6. A combination as in claim 5 in which said pressure expandible and contractible device is so constructed and arranged that a time lag occurs between changes in pressure in said system and the operation of said second switch.

7. A combination as in claim 5 in which said pressure expandible and contractible device comprises a bellows connected to said system, and said arrangement includes a thermoresponsive element responsive to the occurrence of said hot box and a relay controlled by said element for actuating said first switch.

8. A combination as in claim 7 in which said bellows includes a wall having a restricted orifice between said system and the interior of said bellows, said orifice being of size sufficient to cause a time lag between changes in pressure in said system and changes of pressure in the interior of said bellows.

KIRBY B. AUSTIN.

REFERENCES CITED

The following references are of record in the file of this patent:

UNITED STATES PATENTS

| Number | Name | Date |
|---|---|---|
| Re. 15,343 | Hellmann et al. | Apr. 25, 1922 |
| 1,318,369 | Fischer | Oct. 14, 1919 |
| 2,187,958 | Vigne et al. | Jan. 23, 1940 |